(12) United States Patent
Nagata et al.

(10) Patent No.: US 11,987,452 B2
(45) Date of Patent: May 21, 2024

(54) PALLETIZING SYSTEM AND PALLETIZING METHOD

(71) Applicant: HITACHI, LTD., Tokyo (JP)

(72) Inventors: Sanato Nagata, Tokyo (JP); Kei Utsugi, Tokyo (JP); Nobutaka Kimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 302 days.

(21) Appl. No.: 17/639,760

(22) PCT Filed: Mar. 13, 2020

(86) PCT No.: PCT/JP2020/011077
§ 371 (c)(1),
(2) Date: Mar. 2, 2022

(87) PCT Pub. No.: WO2021/181655
PCT Pub. Date: Sep. 16, 2021

(65) Prior Publication Data
US 2022/0289496 A1 Sep. 15, 2022

(51) Int. Cl.
*B65G 43/10* (2006.01)
*B65G 1/00* (2006.01)
(Continued)

(52) U.S. Cl.
CPC ............. *B65G 43/10* (2013.01); *B65G 43/08* (2013.01); *B65G 57/24* (2013.01); *B65G 1/00* (2013.01);
(Continued)

(58) Field of Classification Search
CPC ........ B65G 43/08; B65G 43/10; B65G 57/24; B65G 2201/0267; B65G 2203/0233; B65G 2203/0241; B65G 47/51; B65G 1/00
(Continued)

(56) References Cited

U.S. PATENT DOCUMENTS 8,292,563 B2 * 10/2012 Haris ............... H01L 21/67271
414/217
9,623,596 B2 * 4/2017 Uchiyama ............... B07C 5/342
(Continued)

FOREIGN PATENT DOCUMENTS

JP      63-288805 A    11/1988
JP    2006-143344 A     6/2006
(Continued)

OTHER PUBLICATIONS

International Search Report of PCT/JP2020/011077 dated Jun. 9, 2020.

*Primary Examiner* — Gene O Crawford
*Assistant Examiner* — Lester Rushin, III
(74) *Attorney, Agent, or Firm* — MATTINGLY & MALUR, PC (57) ABSTRACT

A plurality of workpieces include a plurality of first workpieces of a first workpiece group to be loaded onto a first loaded member according to a first loading sequence and a plurality of second workpieces of a second workpiece group to be loaded onto a second loaded member according to a second loading sequence. On a conveying device, workpieces are arranged at ransom with respect to respective arrangement sequences of the first workpiece group and the second workpiece group and the classifications of the first workpiece group and the second workpiece group. On a conveying device, workpieces of the first workpiece group are sequentially arranged based on the first loading sequence and workpieces of the second workpiece group are sequentially arranged based on the second loading sequence. At the same time, the workpieces of the first workpiece group and the second workpiece group are arranged together.

11 Claims, 7 Drawing Sheets

(51) Int. Cl.
*B65G 43/08* (2006.01)
*B65G 57/24* (2006.01)
*B65G 47/51* (2006.01)

(52) U.S. Cl.
CPC ...... *B65G 47/51* (2013.01); *B65G 2201/0267* (2013.01); *B65G 2203/0233* (2013.01); *B65G 2203/0241* (2013.01)

(58) Field of Classification Search
USPC .................................. 198/460.1, 432, 347.1
See application file for complete search history.

(56) References Cited

U.S. PATENT DOCUMENTS

| | | | |
|---|---|---|---|
| 10,640,291 B2* | 5/2020 | Iida | B65G 1/1378 |
| 11,840,359 B2* | 12/2023 | Tuominen | B65G 57/03 |
| 2013/0096713 A1 | 4/2013 | Takizawa et al. | |
| 2019/0033835 A1* | 1/2019 | Ahammer | G05B 19/41865 |

FOREIGN PATENT DOCUMENTS

| | | | |
|---|---|---|---|
| JP | 2013-086915 A | 5/2013 | |
| JP | 2015-037992 A | 2/2015 | |
| JP | 2015-151270 A | 8/2015 | |
| JP | 2019-085213 A | 6/2019 | |
| JP | 2019-182557 A | 10/2019 | |

* cited by examiner

PALLETIZING SYSTEM AND PALLETIZING METHOD

TECHNICAL FIELD

The present invention relates to a palletizing system.

BACKGROUND ART

Japanese Unexamined Patent Application Publication No. 2019-85213 (Patent Literature 1) and Japanese Unexamined Patent Application Publication No. 2019-182557 (Patent Literature 2) describe a system that changes the order of arranged articles and loads the articles onto a pallet by a robot.

CITATION LIST

Patent Literatures

Patent Literature 1: Japanese Unexamined Patent Application Publication No. 2019-85213
Patent Literature 2: Japanese Unexamined Patent Application Publication No. 2019-182557

SUMMARY OF INVENTION

Technical Problem

A palletizing system can make a loading operation efficient by sorting workpieces so as to let the workpiece flow in the order of loading. However, when a plurality of workpieces different in loading destination are let to flow together, the workpieces are often stagnated at a site of sorting operation. For example, when two different types of workpieces to be loaded onto different pallets are let to flow together, workpieces for a pallet of second type are stagnated until a loading operation to a pallet of first type is completed. In this case, a waiting time is produced in the loading operation before the two different types of workpieces are all prepared and this is inefficient.

Solution to Problem

An overview of typical embodiments of the invention disclosed in the present application is briefly described as follows:

A palletizing system according to an embodiment includes: a first conveying device conveying a plurality of workpieces; a sorting device changing the order of conveyance of the workpieces conveyed by the first conveying device; a loading operation unit loading the workpieces sorted by the sorting device onto any of a plurality of loaded members by a robot; and a second conveying device conveying the workpieces sorted by the sorting device toward the loading operation unit. The loaded members include a first loaded member and a second loaded member different from the first loaded member. The workpieces include: a plurality of first workpieces of a first workpiece group to be loaded onto the first loaded member according to a first loading sequence; and a plurality of second workpieces of a second workpiece group to be loaded onto the second loaded member according to a second loading sequence. The workpieces are arranged at random on the first conveying device with respect to respective arrangement sequences of the first workpiece group and the second workpiece group and the classifications of the first workpiece group and the second workpiece group. On the second conveying device, the workpieces of the first workpiece group are sequentially arranged based on the first loading sequence and the workpieces of the second workpiece group are sequentially arranged based on the second loading sequence. At the same time, the workpiece of the first workpiece group and the workpieces of the second workpiece group are arranged together.

A palletizing system according to another embodiment includes: a first conveying device conveying a plurality of workpieces arranged at random; a sorting device changing the order of conveyance of the workpieces conveyed by the first conveying device; a loading operation unit loading the workpieces sorted by the sorting device onto any of a plurality of loaded members by a robot; a second conveying device conveying the workpieces sorted by the sorting device toward the loading operation unit; and a control unit sequentially selecting workpieces to be transferred to the second conveying device and transmitting a control signal to the sorting device. The loaded members include a first loaded member and a second loaded member different from the first loaded member. The workpieces include a plurality of first workpieces of a first workpiece group to be loaded onto the first loaded member according to a first loading sequence; and a plurality of second workpieces of a second workpiece group to be loaded onto the second loaded member according to a second loading sequence. The control unit sequentially selects workpieces of the first workpiece group from among the workpieces based on the first loading sequence and sequentially selects workpieces of the second workpiece group based on the second loading sequence. At the same time, the control unit selects workpieces of the first workpiece group or the second workpiece group so as to maximize the working efficiency of the robot and transmits a control signal to the sorting device.

A palletizing method according to another embodiment includes: a first conveyance process of conveying a plurality of workpieces arranged at random; a sorting process of changing the order of conveyance of the workpieces conveyed at the first conveyance process; a second conveyance process of conveying the workpieces sorted by the sorting device toward a loading operation unit; and a loading operation process of loading the workpieces conveyed at the second conveyance process onto any of a plurality of loaded members by a robot. The loaded members include a first loaded member and a second loaded member different from the first loaded member. The workpieces include: a plurality of first workpieces of a first workpiece group to be loaded onto the first loaded member according to a first loading sequence; and a plurality of second workpieces of a second workpiece group to be loaded onto the second loaded member according to a second loading sequence. At the first conveyance process, workpieces of the first workpiece group and workpieces of the second workpiece group are arranged at random with respect to respective arrangement sequences and the classifications of the first workpiece group and the second workpiece group. At the second conveyance process, the workpieces of the first workpiece group are sequentially arranged based on the first loading sequence and the workpieces of the second workpiece group are sequentially arranged based on the second loading sequence. At the same time, the workpieces of the first workpiece group and the second workpiece group are arranged together.

Advantageous Effects of Invention

An effect brought about by a typical embodiment of the invention disclosed in the present application is briefly described as follows: a loading operation for workpieces can be made efficient.

Other problems, configurations, and effects than described above will be apparent from a description of the following embodiments.

DESCRIPTION OF EMBODIMENTS

In the drawings for explaining the following embodiments, identical members will be marked with identical reference signs and a repetitive description thereof will be omitted. Even a plan view may be hatched for making the drawing easier to understand.

<Palletizing System>

Figure 1:
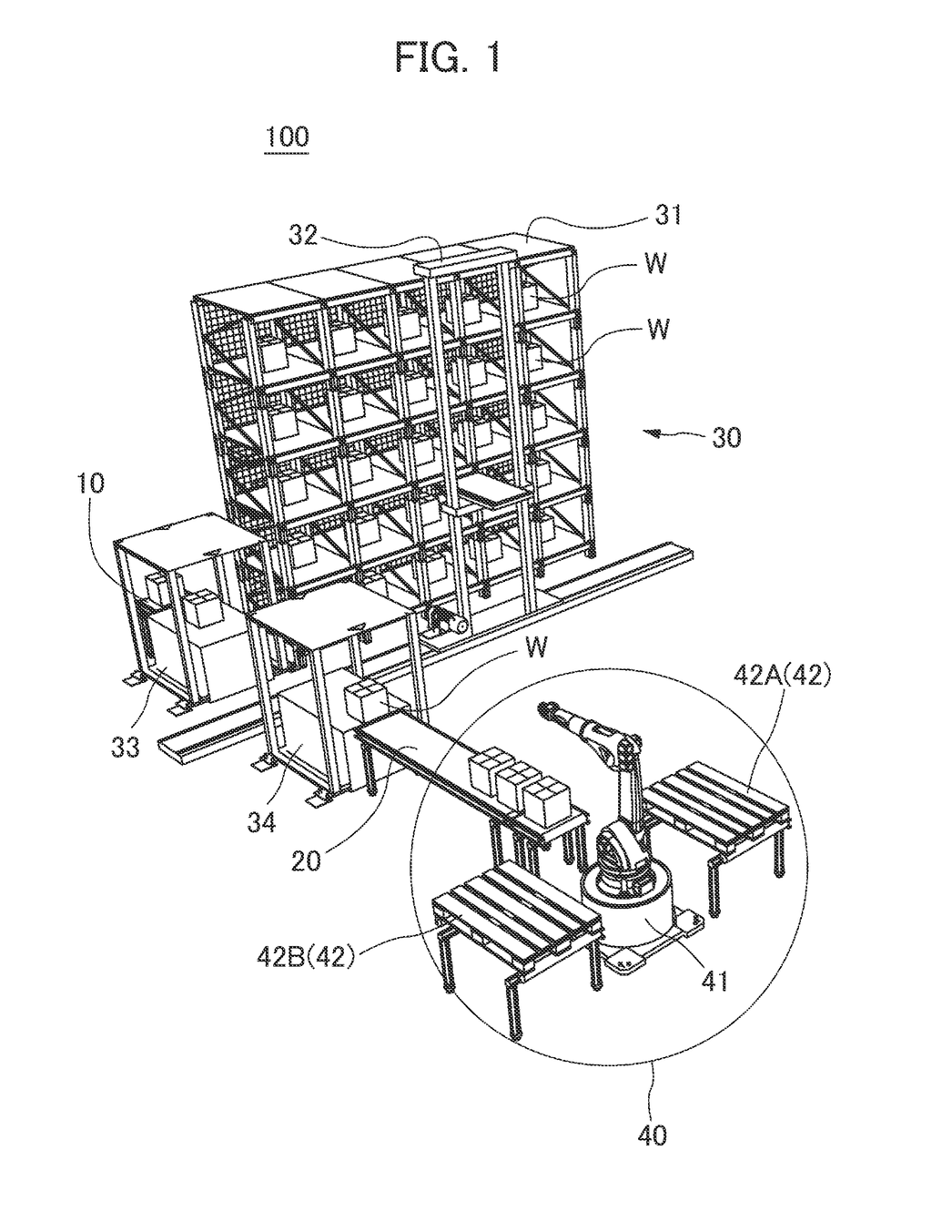
FIG. 1 is a perspective view illustrating a general configuration of a palletizing system as an embodiment of the present invention.
Figure 2:
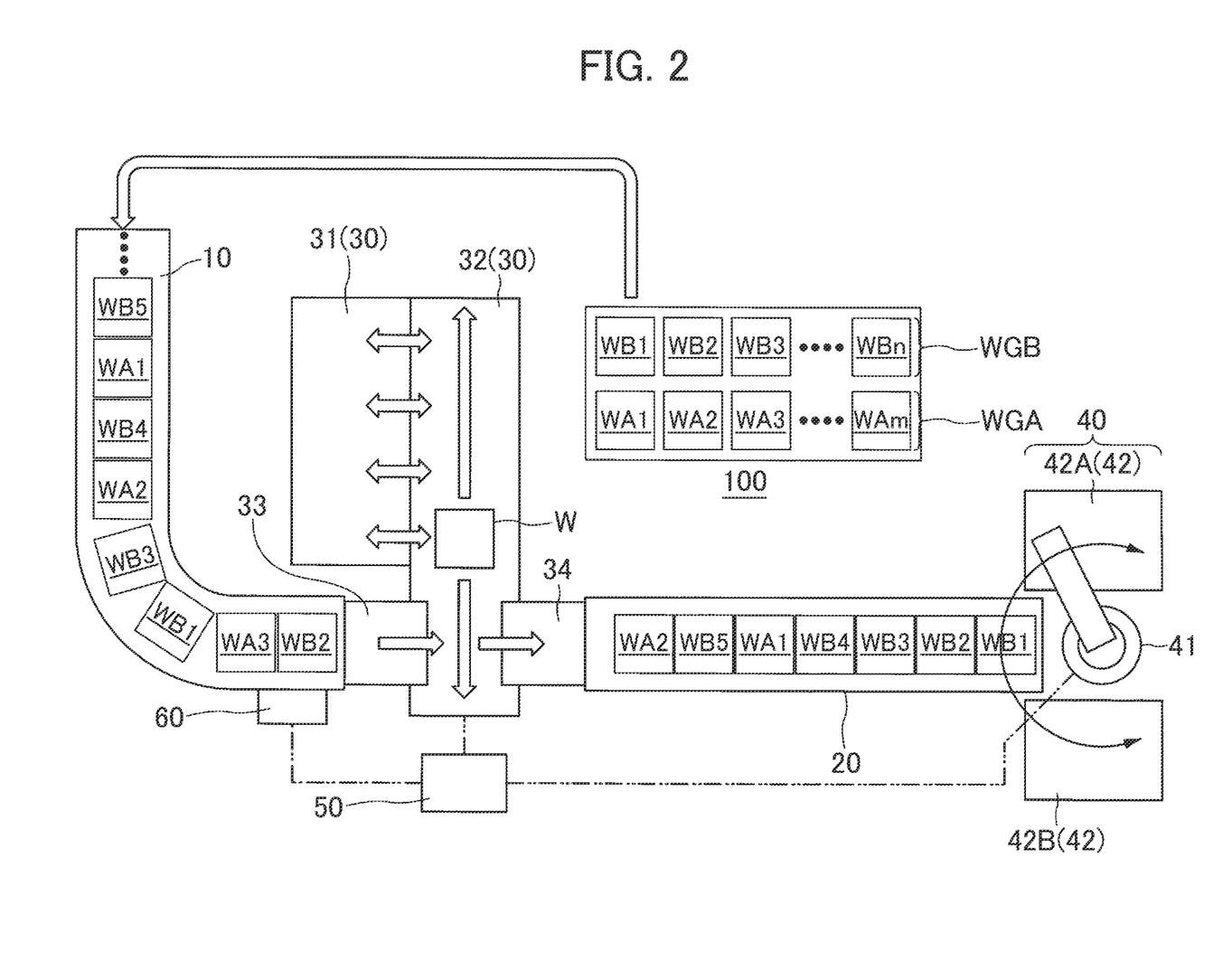
FIG. 2 is an explanatory drawing illustrating a concrete example of a palletizing method using the palletizing system shown in FIG. 1.

FIG. 1 is a perspective view illustrating a general configuration of a palletizing system in the present embodiment. FIG. 2 is an explanatory drawing illustrating a concrete example of a palletizing method using the palletizing system shown in FIG. 1.

The palletizing system 100 in the present embodiment shown in FIG. 1 includes: a conveying device 10 conveying a plurality of workpieces W; and a sorting device 30 changing the order of conveyance of the workpieces W conveyed by the conveying device 10. Further, the palletizing system 100 includes a loading operation unit 40 loading the workpieces W sorted by the sorting device 30 onto any of a plurality of pallets (loaded members) 42 as a loaded member by a robot 41. Furthermore, the palletizing system 100 includes a conveying device 20 conveying the workpieces W sorted by the sorting device 30 toward the loading operation unit 40.

In the example shown in FIG. 1, the pallets 42 include a pallet 42A and a pallet 42B. As shown in FIG. 2, the workpieces W include: a plurality of workpieces W of a workpiece group WGA to be loaded onto the pallet 42A according to a first loading sequence; and a plurality of workpieces W of a second workpiece group WGB to be loaded onto the pallet 42B according to a second loading sequence.

In cases where workpieces of the workpiece group WGA and the workpiece group WGB to be loaded onto different pallets 42 are supplied at random, when an attempt is made to sequentially perform a loading operation onto the pallet 42A and a loading operation onto the pallet 42B, the loading operations are not completed until all the workpieces W of the workpiece group WGA are prepared. Therefore, a plurality of workpieces W are stocked at the sorting device 30. In this case, the robot 41 cannot perform a loading operation until workpieces W in a predetermined loading sequence are conveyed. As a result, a waiting time is produced in the operation and this is inefficient.

Though an illustration is omitted, for example, two sets of the conveying devices 20 and the robots 41 shown in FIG. 1 could be prepared and workpieces of the workpiece group WGA and the workpiece group WGB could be distributed to two conveying devices 20 at the sorting device 30. In this case, workpieces can be let to flow to the conveying devices 20 before the workpieces of the workpiece group WGA and the workpiece group WGB are all prepared. However, a space is required for disposing two sets of the conveying devices 20 and the robots 41. When the respective working efficiency of each of the two robots 41 is taken into account, a waiting time is produced in a loading operation until workpieces W assigned to each robot 41 have been conveyed.

In the present embodiment, meanwhile, at the conveying device 10, a plurality of workpieces W are arranged at random with respect to respective arrangement sequences of the workpiece group WGA and the workpiece group WGA and the classifications of the workpiece group WGA and the workpiece group WGB. At the conveying device 20, workpieces of the workpiece group WGA are sequentially arranged based on a first loading sequence and workpieces of the workpiece group WGB are sequentially arranged based on a second loading sequence. The workpieces of the workpiece group WGA and the workpiece group WGB are arranged together.

Whether to sort workpieces W and the order of sorting are controlled by a control unit 50 (Refer to FIG. 2). Identification of the types of workpieces W (identification about to which workpiece group a workpiece W belongs and what order at which a workpiece W should be loaded) is made by a workpiece identification unit 60 (Refer to FIG. 2). The workpiece identification unit 60 is, for example, a sensor (for example, a code reader reading a code printed on each workpiece W) attached to the conveying device 10 or the transferring unit 33 shown in FIG. 1. The workpiece identification unit 60 and the control unit 50 are electrically connected with each other. The control unit 50 controls whether to sort a workpiece W or the order of sorting of a workpiece W based on a signal of identification data of each workpiece W transmitted from the workpiece identification unit 60. In other words, the control unit 50 transmits a control signal to a carrier machine 32 of the sorting device 30 so as to sequentially select a workpiece W to be transferred to the conveying device 20 and pass the selected workpiece W to a transferring unit 34. Further, the control unit 50 is electrically connected with each of the sorting device 30 and the robot 41. The control unit 50 outputs a control signal to the sorting device 30 to control a sorting process. Furthermore, the control unit 50 outputs a control signal to the robot 41 to control a loading process.

The sorting device 30 includes: a stocker 31 having a plurality of storage areas; and a carrier machine 32 carrying a workpiece W into a storage area of the stocker 31 and carrying a workpiece W out of the stocker 31. Further, the sorting device 30 includes: the transferring unit 33 that receives a workpiece W from the conveying device 10 and discharges a workpiece W to the carrier machine 32; and the transferring unit 34 that receives a workpiece W from the carrier machine 32 and discharges a workpiece W to the conveying device 20. The carrier machine 32 is so structured that the carrier machine can access all the racks of the stocker 31 and each of the transferring units 33 and 34 transferring workpieces W.

Example of Palletizing Method

The palletizing method in the present embodiment can be described based on a concrete example as follows: for example, as shown in FIG. 2, the workpiece group WGA constituted of m workpieces to be loaded onto the pallet 42A in the order of WA1, WA2, WA3, . . . , and WAm (where m is an integer not less than 2). The workpiece group WGB is constituted of n workpieces to be loaded onto the pallet 42B in the order of WB1, WB2, WB3, . . . , and WBn (where n is an integer not less than 2).

At the conveying device 10, workpieces W are arranged at random with respect to respective arrangement sequences of the workpiece group WGA and the workpiece group WGA and the classifications of the workpiece group WGA and the workpiece group WGB. For this reason, as shown in FIG. 2 as an example, workpieces W are conveyed in the order of the workpieces WB2, WA3, WB1, WB3, WA2, WB4, WA1, and WB5 (first conveyance process). The sorting device 30 changes the respective arrangement sequences of the workpieces of the workpiece groups WGA and WGB based on loading sequences but does not sort the workpieces of the workpiece groups WGA and WGB on a classification basis.

In the case of the example shown in FIG. 2, the workpiece WB2 or WA5 to be conveyed before the workpiece WB1 is not selected until the workpiece WB1 is selected by the control unit 50. For this reason, the workpieces WB2 and WA5 are conveyed to the stocker 31 according to a control signal from the control unit 50 and stocked there. The workpiece WB1 flowing to the transferring unit 33 next is the first workpiece W to be loaded among the workpieces of the workpiece group WGB. Therefore, when the workpiece WB1 is placed on the transferring unit 33, the control unit 50 selects the workpiece WB1 as a workpiece to be passed to the transferring unit 34 and transmits a control signal to the sorting device 30. As a result, the workpiece WB1 is not stocked but is transferred to the transferring unit 34 via the carrier machine 32. The workpiece WB1 is conveyed from the transferring unit 34 to the loading operation unit 40 by way of the conveying device 20 (second conveyance process) and loaded onto the pallet 42B at the loading operation unit (loading operation process). As mentioned above, in the case of the present embodiment, even when the workpiece WB1 flows ahead of the workpiece WA1, a loading operation for the workpiece WB1 can be started first. In this case, the working efficiency of the robot 41 can be enhanced as compared with cases where a loading operation is not started until the workpiece WA1 comes.

When the workpiece WB3 arrives at the transferring unit 33, the control unit 50 selects the workpiece WB2 stored in the stocker 31. For this reason, the control unit 50 outputs a control signal to a drive circuit of the carrier machine 32 so as to carry out the workpiece WB2 stored in the stocker 31 before transferring the workpiece WB3 to be conveyed next to the workpiece WB1 to the carrier machine 32 and transfer the workpiece to the transferring unit 34. During this period, the workpiece WB3 is stocked at the transferring unit 33. After the workpiece WB2 is transferred to the transferring unit 34, the workpiece WB3 is transferred from the transferring unit 33 to the transferring unit 34 via the carrier machine 32. Since the workpiece WB3 bypasses the stocker 31 and is conveyed to the loading operation unit 40 in this case, a conveyance time can be shortened.

Since the workpiece WA2 to be conveyed next to the workpiece WB3 is a workpiece W to be let to flow after the workpiece WA1, the workpiece WA2 is stored in the stocker 31. Each of the workpieces WB4 and WA1 to be conveyed subsequently to the workpiece WA2 can be caused to bypass the stocker 31 and transferred to the transferring unit 34. In the case of the example shown in FIG. 2, though six workpieces W are conveyed before the workpiece WA1 arrives at the transferring unit 33, a loading operation can be performed for four workpieces W before transferring the workpiece WA1 to the transferring unit 34.

After the workpiece WA1 is transferred to the transferring unit 34, either the workpiece WB5 at the transferring unit 33 or the workpiece WA2 in the stocker 31 can be transferred to the transferring unit 34. In this case, the control unit 50 selects a workpiece W to be passed to the transferring unit 34 so as to maximize the working efficiency of the robot 41 based on a number of workpieces W before loading operation remaining on the conveying device 20 and a time required for the sorting device 30 to perform a sorting operation. In other words, the control unit 50 determines an arrangement sequence of the workpieces W so as to maximize the working efficiency of the robot 41 based on a number of workpieces W before loading operation remaining on the conveying device 20 and a time required for the sorting device 30 to perform a sorting operation.

For example, in cases where a small number of workpieces W before loading operation remains on the conveying device 20 and the robot 41 completes a loading operation for the workpieces W while a sorting operation is performed by the sorting device 30 (in other words, while the carrier machine 32 carries the workpiece WA2 from the stocker 31), the workpiece WB5 that can be transferred to the transferring unit 34 without an intervention of the stocker 31 is transferred before the workpiece WA2. Meanwhile, in cases where there is an allowance in a number of workpieces W before loading operation remaining on the conveying device 20 and an operation of the robot 41 will not be completed even when the sorting device 30 performs a sorting operation, the workpiece WA2 is transferred to the transferring unit 34 before the workpiece WB5.

In the former, an arrangement sequence of the workpieces W on the conveying device 20 is WB1, WB2, WB3, WB4, WA1, WB5, WA2, . . . . In the latter, an arrangement sequence of the workpieces W on the conveying device 20 is WB1, WB2, WB3, WB4, WA1, WA2, WB5, . . . . In either case, on the conveying device 20, the workpieces of the workpiece groups WGA and WGB are respectively sequentially arranged based on a loading sequence but the workpieces of the workpiece group WGA and the workpiece group WGB are arranged together (second conveyance process). A number of workpieces W before loading operation remaining on the conveying device 20 can be obtained, for example, by storing a number of workpieces passed to the transferring unit 34 and performing a calculation based on a time required to load workpieces W onto the pallet 42 and a time that has lapsed after passage to the transferring unit 34. Alternatively, a sensor similar to that attached to the workpiece identification unit 60 may be attached to the conveying device 20.

In FIG. 2, a number of workpiece groups is set to two, the workpiece groups WGA and WGC, for the sake of simplification. However, a number of workpiece groups is not limited to two and may be three or more. For example, when a loading operation is performed for workpieces of three or more workpiece groups, workpieces W of a third workpiece group can be stocked in the stocker 31 until a loading operation is completed for either the pallet 42A or 42B shown in FIG. 2. When the loading operation is completed for either the pallet 42A or 42B and the pallet 42 loaded with the workpieces is carried out, then, a new pallet 42 can be carried in and workpieces belonging to the third workpiece group can be loaded onto the new pallet. Alternatively, a loading operation can also be performed for three or more workpiece groups by a method described later as a modification.

According to a palletizing method practiced using a palletizing system in the present embodiment, a workpiece need not be stocked in the stocker 31 until all the workpieces W of the workpiece group WGA or WGB are prepared; therefore, a time before a start of loading operation can be shortened.

<Modification 1>

Figure 3:
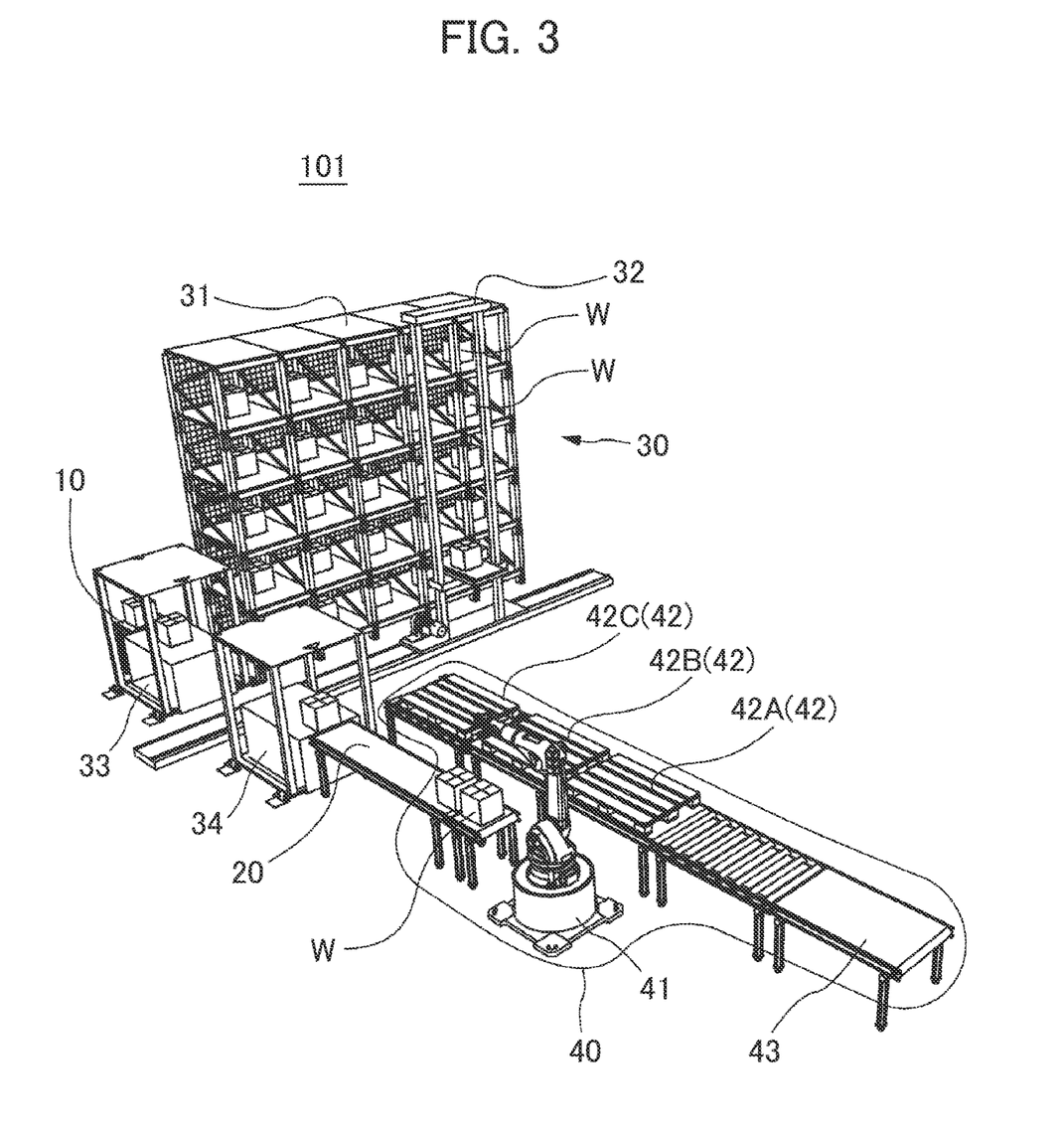
FIG. 3 is a perspective view illustrating a general configuration of a palletizing system in a modification to the palletizing system shown in FIG. 1.
Figure 4:
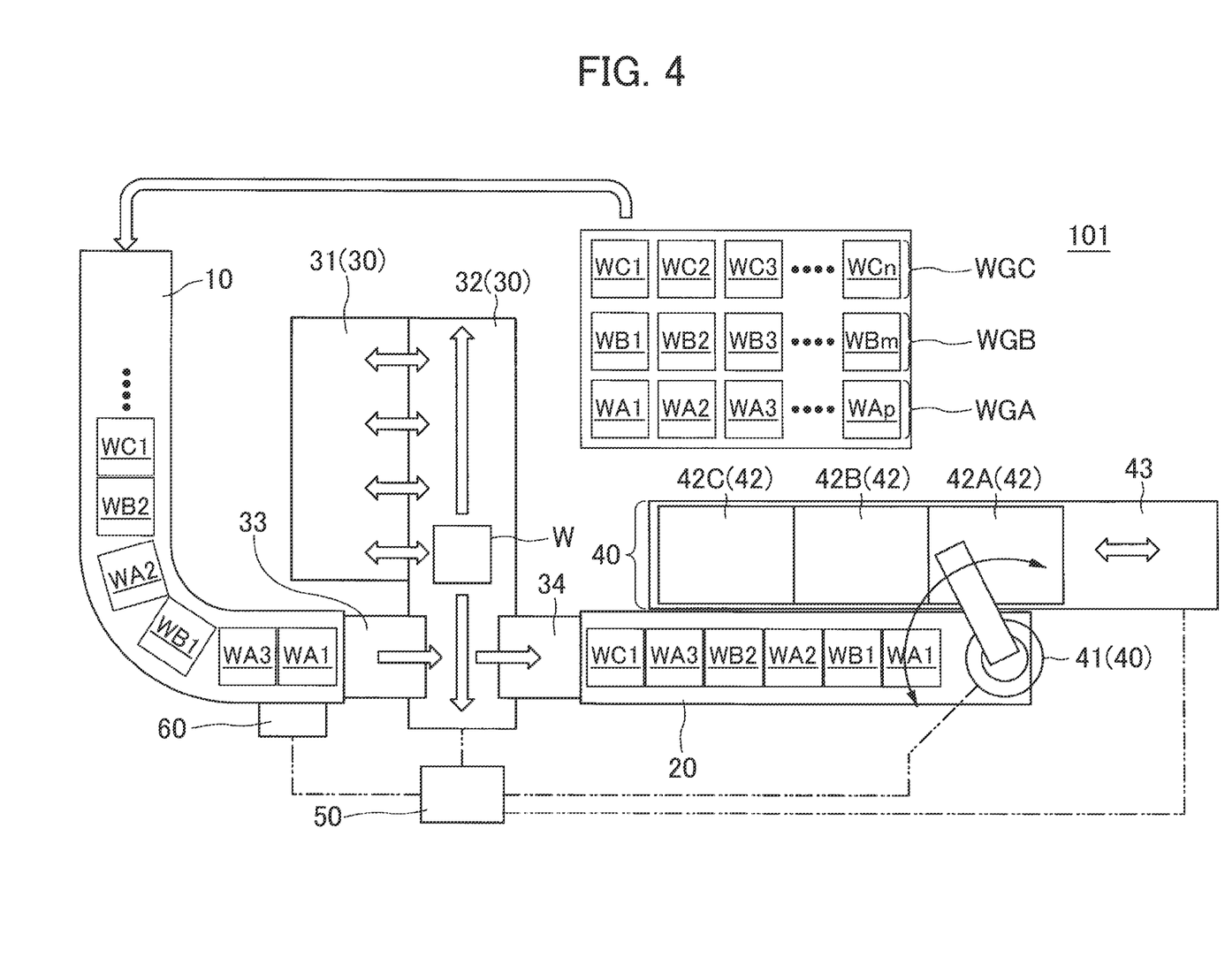
FIG. 4 is an explanatory drawing illustrating a concrete example of a palletizing method using the palletizing system shown in FIG. 3.

A description will be given to a modification to the palletizing method using the palletizing system 100 shown in FIG. 1 and FIG. 2. FIG. 3 is a perspective view illustrating a general configuration of a palletizing system as a modification to that shown in FIG. 1. FIG. 4 is an explanatory drawing illustrating a concrete example of a palletizing method using the palletizing system shown in FIG. 3.

The palletizing system 101 shown in FIG. 3 and FIG. 4 is different from the palletizing system 100 shown in FIG. 1 and FIG. 2 in that a conveyor 43 is provided as a switching device switching a position of a pallet 42 at the loading operation unit 40.

The conveyor 43 is a switching device that conveys a pallet 42 for which a loading operation has not been completed yet among a plurality of pallets 42 and switches a pallet 42 as a target of a loading operation. As shown in FIG. 4 as an example, a plurality of workpieces W include: workpieces W of a workpiece group WGA to be loaded onto a pallet 42A according to a first loading sequence; workpieces W of a second workpiece group WGB to be loaded onto a pallet 42B according to a second loading sequence; and workpieces W of a second workpiece group WGC to be loaded onto a pallet 42C according to a third loading sequence. The workpiece group WGC is constituted of p workpieces to be loaded onto the pallet 42C in the order of WC1, WC2, WC3, . . . , WCp (where, p is an integer not less than 2).

A palletizing method using the palletizing system 101 in the present modification includes a process of switching a pallet 42 under loading operation according to a classification of a workpiece W flowing on the conveying device 20. In this case, even when some of a plurality of pallets 42 are disposed in a position the robot 41 cannot directly access, a pallet 42 can be moved to a position accessible to the robot 41 by actuating the conveyor 43. According to the present modification, a number of pallets 42 subjected to loading operation in parallel can be increased. In the example shown in FIG. 3, a loading operation can be performed in parallel for each of the pallets 42A, 42B, and 42C. Though an illustration is omitted, as another modification to the present modification, a number of pallets 42 may be set to four or more.

In the case of the present modification, the positions of a plurality of pallets 42 can be shifted; therefore, a degree of freedom in a layout of the pallets 42 is enhanced as compared with the palletizing system 100 (Refer to FIG. 1) in which pallets 42 are disposed within a range the robot 41 can access. For this reason, for example, even when a number of pallets 42 for which a loading operation is performed in parallel is two as in FIG. 1, a disposition space for the pallets 42 can be reduced and thus an operation can be performed in a space-saving manner.

A description will be given to a palletizing method using the palletizing system 101 with reference to FIG. 4. In the example shown in FIG. 4, on the conveying device 10, workpieces W are disposed in the order of the workpieces WA1, WA3, WB1, WA2, WB2, . . . . In this case, the control unit selects the workpiece WA1 first and outputs a control signal so as to transfer the workpiece to the conveying device 20. The workpiece WA3 that arrives at the transferring unit 33 next is not selected by the control unit 50 but is conveyed to the stocker 31 via the carrier machine 32 and stocked there. In this respect, this method is the same as the method using the palletizing system 100 described with reference to FIG. 1 and FIG. 2.

Subsequently, the control unit 50 selects the workpiece WB1 that has arrived at the transferring unit 33. A control signal is outputted from the control unit 50 to the carrier machine 32 so as to transfer the workpiece WB1 to the transferring unit 34. The control unit 50 is connected also to the robot 41 and the conveyor 43. For this reason, when the control unit 50 selects the workpiece WB1, the control unit outputs a control signal so as to, after an operation of loading the workpiece WA1 by the robot 41 is completed, actuate the conveyor 43 to move the pallet 42B to within a range accessible to the robot 41. According to this control signal, at the loading operation unit 40, a switching process is performed to switch a pallet 42 as a target of loading operation from the pallet 42A to the pallet 42B.

Subsequently, the control unit 50 selects the workpiece WA2 that has arrived at the transferring unit 33. As the result of the workpiece WA2 being selected, a loading operation onto the pallet 42B is switched to a loading operation onto the pallet 42A. The operation of the switching process is the same as that of the above-mentioned switching process from the pallet 42A to the pallet 42B.

Subsequently, the control unit 50 selects either the workpiece WB2 that has arrived at the transferring unit 33 or the workpiece WA3 stocked in the stocker 31. According to a sorting rule, either the workpiece WB2 or WA3 can be selected. In this case, the control unit 50 sorts the workpieces W so as to maximize the working efficiency of the robot 41 based on a number of workpieces W before loading operation remaining on the conveying device 20, a time required for the switching device (conveyor 43) to perform a switching operation, and a time required for a sorting operation by the sorting device 30.

In the case of the example shown in FIG. 4, a switching process using the conveyor 43 does not require much time and a time required to convey the workpiece WA3 from the stocker 31 to the transferring unit 34 is longer. In this case, even when a number of times of a switching process using the conveyor 43 is increased, reducing a number of times of a sorting process by the sorting device 30 is more advantageous. For this reason, in the case of the example shown in FIG. 4, the workpiece WB2 is selected before the workpiece WA3 stocked in the stocker 31 and then the workpiece WA3 is selected.

As mentioned above, the processing efficiency of an entire workpiece loading operation can be enhanced by determining a workpiece W to be selected by the control unit 50 with maximization of the working efficiency of the robot 41 taken as determination criteria. The foregoing is just an example and is variously modified. For example, when a time of a switching process using the conveyor 43 is longer than a time required to convey the workpiece WA3 from the stocker 31 to the transferring unit 34, the workpiece WA3 may be selected before the workpiece WB2. For example, even in cases where a time of a switching process using the conveyor 43 is shorter than a time required to convey the workpiece WA3 from the stocker 31 to the transferring unit 34, the same processing as the example shown in FIG. 4 is performed when a large number of workpieces W before loading operation remain on the conveying device 20 and the workpiece WA3 can be conveyed from the stocker 31 to the transferring unit 34 while these workpieces W are loaded. That is, the workpiece WB2 is selected before the workpiece WA3 stoked in the stocker 31 and then the workpiece WA3 is selected.

The palletizing system 101 is the same as the palletizing system 100 described with reference to FIG. 1 and FIG. 2 except the above-mentioned difference. Therefore, a repetitive description will be omitted.

<Modification 2>

Figure 5:
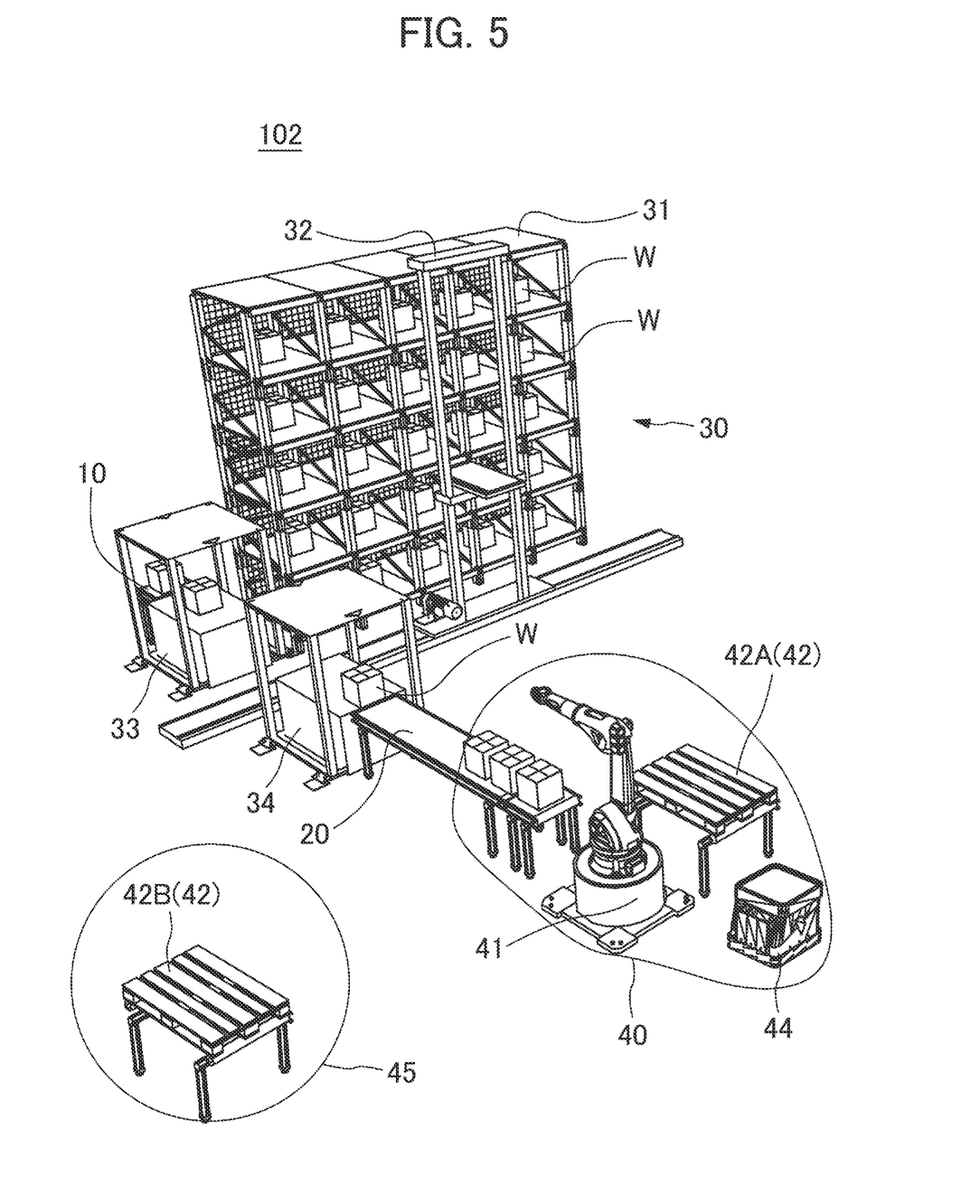
FIG. 5 is a perspective view illustrating a general configuration of a palletizing system in another modification to the palletizing system shown in FIG. 1.
Figure 6:
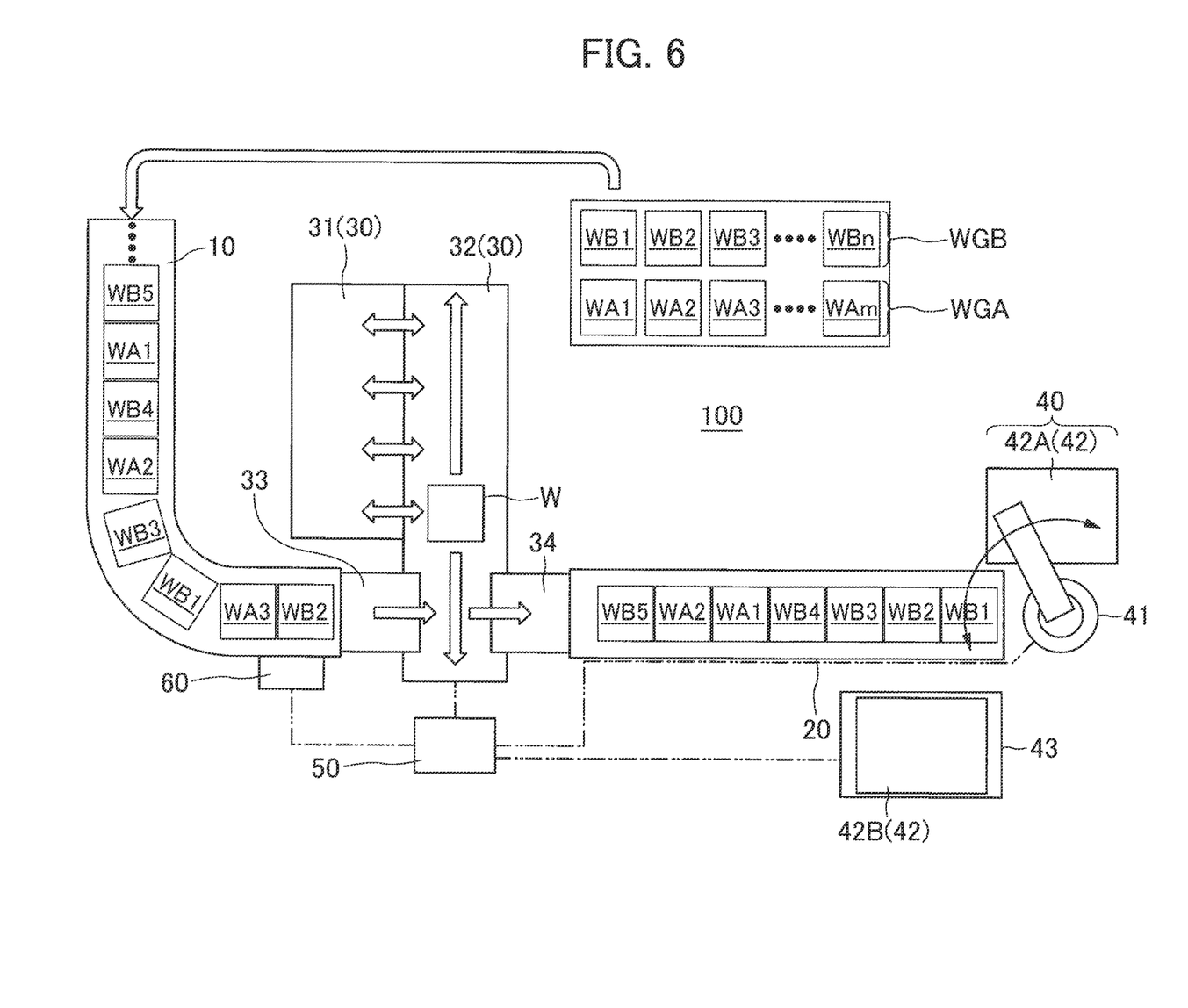
FIG. 6 is an explanatory drawing illustrating a concrete example of a palletizing method using the palletizing system shown in FIG. 5.

A description will be given to another modification to the palletizing method using the palletizing system 100 shown in FIG. 1 and FIG. 2. FIG. 5 is a perspective view illustrating a general configuration of a palletizing system as the other modification to that shown in FIG. 1. FIG. 6 is an explanatory drawing illustrating a concrete example of a palletizing method using the palletizing system shown in FIG. 5.

The palletizing system 102 shown in FIG. 5 is different from the palletizing system 100 shown in FIG. 1 in that a self-propelled conveying device 44 is provided as a switching device shifting a position of a pallet 42 at the loading operation unit 40.

The self-propelled conveying device 44 is an automated guided vehicle capable of holding and conveying a pallet 42 for which a loading operation has not been completed yet among a plurality of pallets 42. The self-propelled conveying device 44 conveys a pallet 42 between a work-in-process storage unit 45 storing a pallet 42 for which a loading operation has not been completed yet and the loading operation unit 40. When pallets 42 are switched using the self-propelled conveying device 44 as mentioned above, a space for the loading operation unit 40 can be especially reduced. As shown in FIG. 6, the control unit 50 is electrically connected with the self-propelled conveying device 44.

In the case of the present modification, however, a switching process for pallets 42 requires much time. For this reason, the control unit 50 shown in FIG. 6 selects a workpiece W so as to reduce a number of times of switching pallets 42. For example, as seen from a comparison of FIG. 2 and FIG. 6, FIG. 2 and FIG. 6 are identical with each other in an arrangement sequence of a plurality of workpieces W on the conveying device 10. In the example shown in FIG. 6, however, an arrangement sequence of workpieces W on the conveying device 20 is WB1, WB2, WB3, WB4, WA1, WA2, WB5, and . . . . In the case of the arrangement sequence shown in FIG. 6, a number of times of switching process can be reduced as compared with the arrangement sequence shown in FIG. 2. In the case of the palletizing system 102 requiring much time for switching process, the working efficiency of the robot 41 can be enhanced by reducing a number of times of switching process.

The palletizing system 102 is the same as the palletizing system 100 described with reference to FIG. 1 and FIG. 2 except the above-mentioned difference. Therefore, a repetitive description will be omitted.

<Modification 3>

Figure 7:
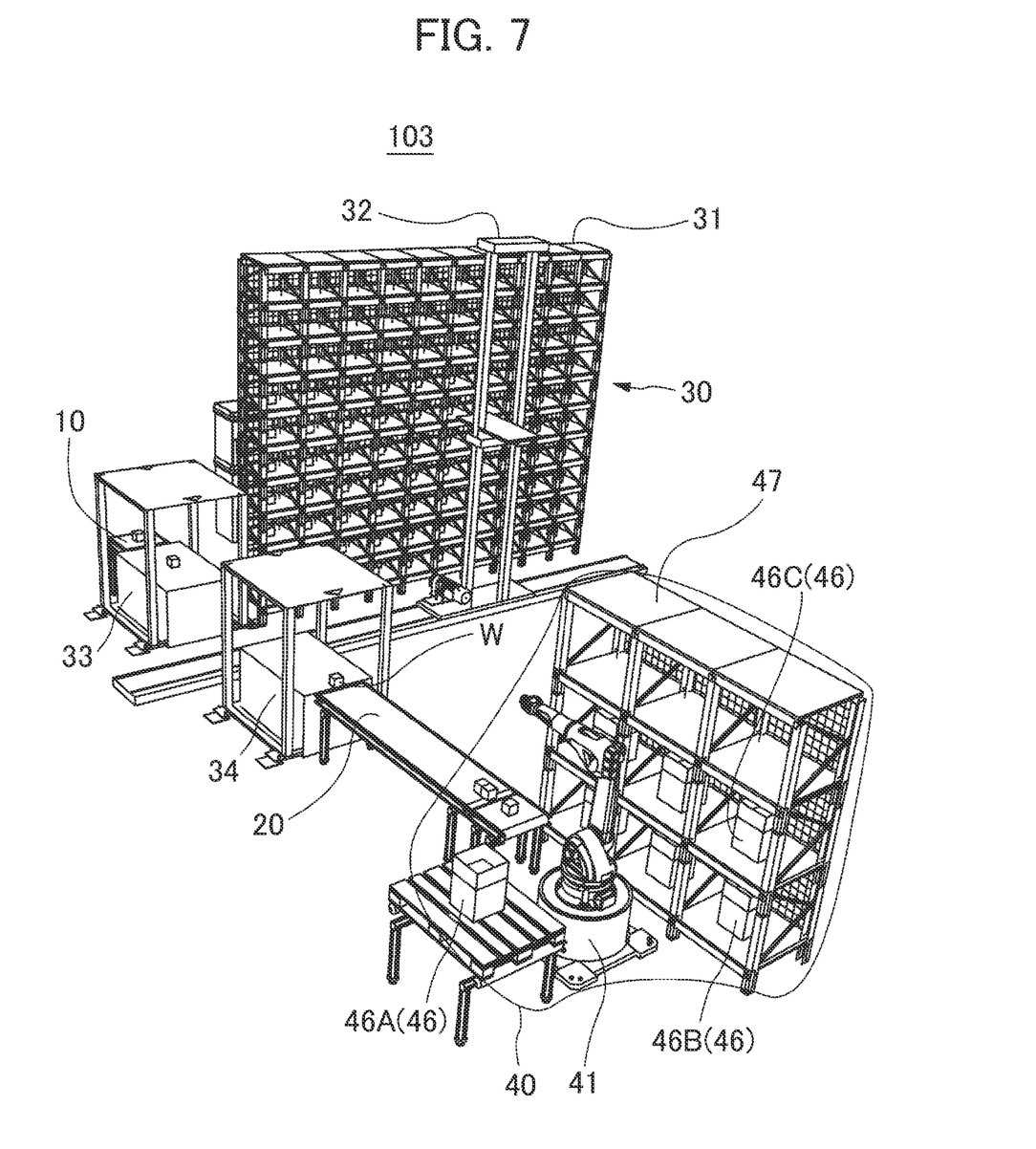
FIG. 7 is a perspective view illustrating a general configuration of a palletizing system in another modification to the palletizing system shown in FIG. 1.

A description will be given to another modification to the palletizing method using the palletizing system 100 shown in FIG. 1 and FIG. 2. FIG. 7 is a perspective view illustrating a general configuration of a palletizing system as the other modification to that in FIG. 1.

The palletizing system 103 shown in FIG. 7 is different from the palletizing system 100 in FIG. 1 in the following respects. First, the palletizing system 103 uses a case 46 as a loaded member on which workpieces W are loaded in place of a pallet 42 (Refer to FIG. 1). Second, the palletizing system 103 uses the robot 41 as a switching device switching cases 46 during a loading operation.

Each of the cases 46 is a case having a weight, a size, and a shape sufficient for the robot 41 to hold, such as an assembly-type paper box. A rack (case storage unit) 47 capable of housing a plurality of cases 46 is disposed at the loading operation unit 40. Since the rack 47 is disposed within the reach of an arm of the robot 41, the robot 41 can convey a case 46 to any position of the rack 47. The robot 41 has a function of placing a workpiece W in a case 46. The workpiece W is an article, such as a component of a structure, smaller in volume than the case 46. In FIG. 7, the cases 46A, 46B, and 46C are shown but a number of cases 46 is not limited to three and may be two or four or more.

In the case of the palletizing system 103 in the present modification, as mentioned above, the robot 41 has a function of a switching device conveying cases 46 to the rack 47 and a function of placing workpieces W in the cases 46. In this case, a placement operation for a large number of cases 46 can be performed in parallel in a small space.

Though an illustration of a concrete example of a palletizing method using the palletizing system 103 is omitted, the palletizing method is the same as the palletizing method described as Modification 1 except that the switching process by the conveyor 43 in the example shown in FIG. 4 is performed by the robot 41 shown in FIG. 7 and that the pallet 42 is replaced with the case 46.

The palletizing system 103 is the same as the palletizing system 101 described with reference to FIG. 3 and FIG. 4 except the above-mentioned difference. Therefore, a repetitive description will be omitted. The description of the present modification is based on the assumption that cases 46 as the target of placement are switched at the loading operation unit 40. As a modification, the case 46 shown in FIG. 7 can also be used in the palletizing system 100 described with reference to FIG. 1 and FIG. 2.

Up to this point, a description has been given to representative modifications to the present embodiment. The present invention is not limited to the above-mentioned embodiment or representative modifications and various modifications are applicable without departing from the subject matter of the present invention.

Up to this point, a description has been given to the various modifications and but individual modifications may be appropriately combined and applied to the present invention.

INDUSTRIAL APPLICABILITY

The present invention is applicable to a palletizing system.

LIST OF REFERENCE SIGNS 10, 20 Conveying device
30 Sorting device

31 Carrier machine
31 Stocker
32 Carrier machine
33, 34 Transferring unit
40 Loading operation unit
41 Robot
42, 42A, 42B, 42C Pallet (loaded member)
43 Conveyor
44 Self-propelled conveying device
45 Work-in-process storage unit
46, 46A, 46B, 46C Case (loaded member)
47 Rack (case storage unit)
50 Control unit
60 Workpiece identification unit
100, 101, 102, 103 Palletizing system
W, WA1, WA1, WA2, WA3, WA5, WAn, WB1, WB2, WB3, WB4, WB5, WBm, WC1, WC2, WV3, WCp Workpiece
WGA, WGB, WGC Workpiece group

The invention claimed is:

1. A palletizing system comprising:
a first conveying device conveying a plurality of workpieces;
a sorting device changing the order of conveyance of the workpieces conveyed by the first conveying device;
a loading operation unit loading the workpieces sorted by the sorting device onto any of a plurality of loaded members by a robot; and
a second conveying device conveying the workpieces sorted by the sorting device toward the loading operation unit,
wherein the loaded members include a first loaded member and a second loaded member different from the first loaded member,
wherein the workpieces include a plurality of first workpieces of a first workpiece group to be loaded onto the first loaded member according to a first loading sequence and a plurality of second workpieces of a second workpiece group to be loaded onto the second loaded member according to a second loading sequence,
wherein on the first conveying device, the workpieces are arranged at random with respect to respective arrangement sequences of the first workpiece group and the second workpiece group and the classifications of the first workpiece group and the second workpiece group, and
wherein on the second conveying device, the workpieces of the first workpiece group are sequentially arranged based on the first loading sequence and the workpieces of the second workpiece group are sequentially arranged based on the second loading sequence, the workpieces of the first workpiece group and the second workpiece group being arranged together.

2. The palletizing system according to claim 1,
wherein the loading operation unit further includes a switching device that conveys, among the loaded members, a loaded member for which loading operation has not been completed yet and switches loaded members as the target of loading operation.

3. The palletizing system according to claim 2,
wherein the switching device is a conveyor capable of simultaneously conveying the loaded members.

4. The palletizing system according to claim 2,
wherein the switching device is a self-propelled conveying device capable of holding and conveying one of the loaded members, and
wherein the self-propelled conveying device conveys a loaded member between a work-in-process storage unit storing a loaded member for which loading operation has not been completed yet and the loading operation unit.

5. The palletizing system according to claim 2,
wherein each of the loaded members is a case that can be held by the robot,
wherein the loading operation unit includes a case storage unit disposed within the reach of an arm of the robot and capable of housing the cases, and
wherein the robot has a function of the switching device conveying the cases to the case storage unit and a function of placing the workpieces in the cases.

6. The palletizing system according to claim 2, further comprising:
a control unit controlling change of the order of conveyance of the workpieces at the sorting device; and
a workpiece identification unit connected to the control unit and identifying types of the workpieces flowing on the first conveying device,
wherein the control unit sorts the workpieces so as to maximize the working efficiency of the robot based on a number of workpieces before loading operation remaining on the second conveying device, a time required for switching by the switching device, and a time required for sorting operation by the sorting device.

7. The palletizing system according to claim 1,
wherein each of the loaded members is a pallet.

8. The palletizing system according to claim 1,
wherein each of the loaded members is a case capable of housing the workpieces.

9. A palletizing system comprising:
a first conveying device conveying a plurality of workpieces arranged at random;
a sorting device changing the order of conveyance of the workpieces conveyed by the first conveying device;
a loading operation unit loading the workpieces sorted by the sorting device onto any of a plurality of loaded members by a robot;
a second conveying device conveying the workpieces sorted by the sorting device toward the loading operation unit; and
a control unit sequentially selecting a workpiece to be transferred to the second conveying device and transmitting a control signal to the sorting device,
wherein the loaded members include a first loaded member and a second loaded member different from the first loaded member,
wherein the workpieces include a plurality of first workpieces of a first workpiece group to be loaded onto the first loaded member according to a first loading sequence and a plurality of second workpieces of a second workpiece group to be loaded onto the second loaded member according to a second loading sequence, and
wherein the control unit sequentially selects workpieces of the first workpiece group based on the first loading sequence among the workpieces and sequentially selects workpieces of the second workpiece group based on the second loading sequence and selects a workpiece of the first workpiece group or the second workpiece group so as to maximize the working efficiency of the robot and transmits a control signal to the sorting device.

10. A palletizing method comprising:
a first conveyance process of conveying a plurality of workpieces arranged at random;
a sorting process of changing the order of conveyance of the workpieces conveyed at the first conveyance process;
a second conveyance process of conveying the workpieces sorted by the sorting device toward a loading operation unit; and
a loading operation process of loading the workpieces conveyed at the second conveyance process onto any of a plurality of loaded members by a robot,
wherein the loaded members include a first loaded member and a second loaded member different from the first loaded member,
wherein the workpieces include a plurality of first workpieces of a first workpiece group to be loaded onto the first loaded member according to a first loading sequence and a plurality of second workpieces of a second workpiece group to be loaded onto the second loaded member according to a second loading sequence,
wherein at the first conveyance process, workpieces are arranged at random with respect to respective arrangement sequences of the first workpiece group and the second workpiece group and the classifications of the first workpiece group and the second workpiece group, and
wherein at the second conveyance process, workpieces of the first workpiece group are sequentially arranged based on the first loading sequence and workpieces of the second workpiece group are sequentially arranged based on the second loading sequence, the workpieces of the first workpiece group and the second workpiece group being arranged together.

11. The palletizing method according to claim 10,
wherein the loading operation process further comprises a switching process of conveying, among the loaded members, a loaded member for which loading operation has not been completed yet and switching loaded members as the target of loading operation.

\* \* \* \* \*